United States Patent [19]

Kojima

[11] Patent Number: 4,744,740
[45] Date of Patent: May 17, 1988

[54] STRAIGHT-HYDRAULIC MOLD CLAMPING SYSTEM IN MOLDING MACHINE

[75] Inventor: Hisashi Kojima, Tokyo, Japan

[73] Assignee: Technoplas, Inc., Tokyo, Japan

[21] Appl. No.: 800,371

[22] Filed: Nov. 22, 1985

Related U.S. Application Data

[63] Continuation of Ser. No. 526,693, Aug. 25, 1983, abandoned.

[51] Int. Cl.[4] .................................................. B30B 15/28
[52] U.S. Cl. ........................................ 425/107; 92/160; 425/590; 425/595; 425/451.2; 425/451.9
[58] Field of Search ............... 425/107, 149, 450.1, 425/451, 451.2, 451.9, 542, 589, 590, 595, DIG. 115, DIG. 221, 541; 92/160, 181 R; 138/30, 31

[56] References Cited

U.S. PATENT DOCUMENTS

| | | | |
|---|---|---|---|
| 3,319,534 | 5/1967 | Boonshaft | 92/181 R |
| 3,456,297 | 7/1969 | Andreasson | 425/595 |
| 3,767,012 | 10/1973 | Jimi et al. | 425/107 |
| 3,822,975 | 7/1974 | Hehl | 425/107 |
| 3,833,204 | 9/1974 | Hehl | 366/76 |
| 3,841,823 | 10/1974 | Hehl | 425/107 |
| 3,857,440 | 12/1974 | Ruegg | 425/451.9 |
| 4,009,983 | 3/1977 | Jacobs | 425/451.9 |
| 4,014,555 | 3/1977 | Jacottet | 277/27 |
| 4,094,621 | 6/1978 | Hehl | 425/450.1 |
| 4,105,385 | 8/1978 | Hehl | 425/450.1 |

FOREIGN PATENT DOCUMENTS

| | | | |
|---|---|---|---|
| 38-4483 | 4/1963 | Japan | 425/107 |
| 56-49416 | 5/1981 | Japan | |

Primary Examiner—Jan H. Silbaugh
Assistant Examiner—J. Fortenberry
Attorney, Agent, or Firm—Wenderoth, Lind & Ponack

[57] ABSTRACT

A straight-hydraulic mold clamping system for use in a molding machine has a bearing portion for a rod of a mold clamp cylinder provided with a plurality of annular oil grooves within which an oil functions, and utilizes the rigidity of the rod so as to horizontally support a movable platen and a molding die attached to the movable platen in a cantilever manner and maintain the horizontality of the movable platen and the molding die.

1 Claim, 2 Drawing Sheets

STRAIGHT-HYDRAULIC MOLD CLAMPING SYSTEM IN MOLDING MACHINE

This application is a continuation of application Ser. No. 526,693, filed Aug. 25, 1983, now abandoned.

BACKGROUND OF THE INVENTION

1. Field of the Invention

The present invention relates to a mold clamping system for use in an injection molding machine, a die casting machine or the like, and more particularly to the construction of a straight-hydraulic mold clamping system capable of keeping the platens in parallel.

2. Description of the Prior Art

A conventional straight-hydraulic mold clamping system for use in an injection molding machine etc. comprises a bed, a cylinder for mold clamp disposed horizontally on the bed, and a stationary platen and a movable platen disposed in the reciprocating direction of the piston in the mold clamp cylinder respectively and attached to tie bars. The mold clamp cylinder has a piston reciprocating within the inner chamber of the mold clamp cylinder, a rod projecting to the outside of the mold clamp cylinder, and a bearing portion for the rod. The movable platen is fastened to the rod. The rod bearing portion is constituted by a bushing having a clearance of at least 30μ for allowing advance or retreat of the rod. Therefore, there is a fair possibility of the rod being eccentric within the range of the clearance of the bearing portion and simultaneously of the tie bars being bent down by the weights of the movable platen and a molding die attached thereto, with the result that parallelism of the movable and stationary platens deteriorates. If this parallelism deteriorates, an offset load is exerted on guide pins etc. of the molding die and gives rise to a wear phenomenon, registration of the molding dies cannot completely be effected and consequently, the service life of the molding dies is shortened.

In order to eliminate the aforementioned drawbacks, there has heretofore been adopted either a method of making the diameter of the tie bars large so as to minimize the deflection of the tie bars or a method of interposing a slide plate between the movable platen and the bed.

In the former method, however, is a limit to the increase of the diameter of the tie bars because the larger the diameter of the tie bars, the smaller the area of the platen surface to which a molding die is to be attached. Accordingly, if the surface area of the platen is enlarged the full load exerted on the system is undesirably increased. Therefore, the diameter of the tie bars can only be made larger within the range which will not occupy the surface area of the platen to which the molding die is to be attached.

Further, in the latter method, the parallelism of the mold clamp cylinder, stationary platen and movable platen provided with the slide plate must be retained. However, since the bed of the system is not necessarily horizontal and since the bearing portion has a clearance, it is difficult to precisely obtain the aforementioned parallelism from a standpoint of mechanical technology. Assuming that the parallelism can precisely be obtained, there are disadvantages that the slide plate is thermally affected during a molding cycle and will change in dimension, that since there is formed between the slide plate and the bed a clearance necessary for the sliding of the slide plate and since the slide plate will be worn due to metallic contact with the bed, the clearance must be adjusted in accordance with the frequency of use while allowing for errors, and that the slide plate is required to be slightly adjusted in accordance with the weight of a molding die every time the molding die is changed. In any event, the limit of the deviation from parallelism of the platens is 50μ at most and cannot be guaranteed over a long period of time. In the present state, therefore, spotting of the molding dies is carried out in consideration of the aforementioned deviation from parallelism of the platens.

In proportion as engineering plastics is developed, there is now an increased demand for accuracy on the order of microns in injection molding. In order to fulfill this demand, molding dies are absolutely required to cause their parting surfaces to precisely register with each other. Even though the molding dies are precisely finished, if there are errors in mold registration, it will be impossible to effect molding with accuracy on the order of microns. In this sense, since the limit of the deviation from parallelism of the platens of the conventional mold clamping system is 50μ at most, the molding dies of the system cannot be used at all for precision parts which are required not to have accuracy deviation of more than 10μ.

SUMMARY OF THE INVENTION

An object of the present invention is to provide a straight-hydraulic mold clamping system in a molding machine, which has a self-alignment construction in response to the amount of advance or retreat of a rod by allowing oil to function within annular oil grooves formed in a rod bearing portion of a mold clamp cylinder and also has a cantilever construction utilizing the rigidity of the rod, whereby the parallelism of a movable platen is precisely retained and maintained over a long period of time without causing any deviation from parallelism.

To attain this object, according to the present invention, there is provided a straight-hydraulic mold clamping system for use in a molding machine, which comprises a bed, tie bars, a movable platen movably attached to the tie bars, a stationary platen fixed to the tie bars, molding dies attached one each to the movable platen and the stationary platen, and a mold clamp cylinder, the movable platen, stationary platen and mold clamp cylinder being disposed horizontally on the bed, the mold clamp cylinder comprising a piston reciprocating within the inside thereof, a rod projecting to the outside thereof and having the movable platen mounted thereon, and a bearing portion for the rod having a plurality of annular oil grooves formed therein, whereby the movable platen is moved with said tie bars as guides to effect mold-opening and mold-closing.

The aforementioned object and other objects, characteristic features and advantages of the present invention will become apparent from the description given hereinbelow in detail with reference to the accompanying drawings.

DESCRIPTION OF THE PREFERRED EMBODIMENTS

The present invention will now be described in detail with reference to the illustrated embodiments.

Figure 1:
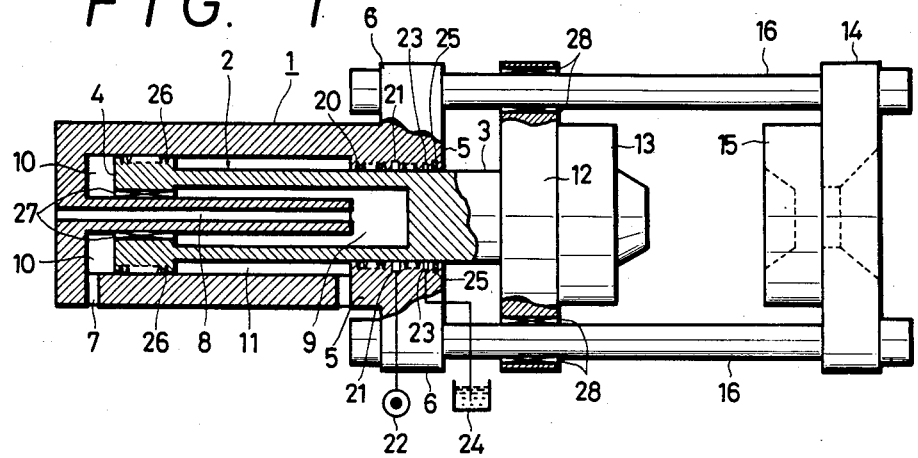
FIG. 1 is a partially sectioned schematic view of one embodiment of the mold clamping system according to the present invention, showing the mold open.
Figure 2:
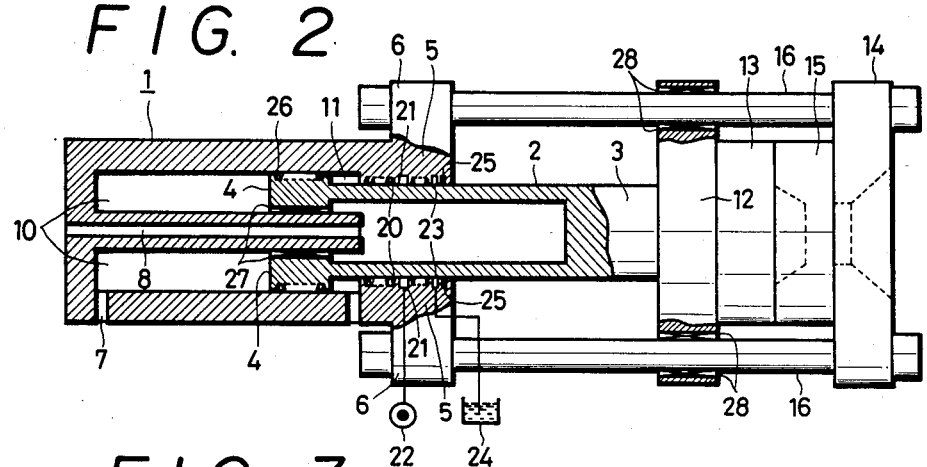
FIG. 2 is a partially sectioned schematic view of the embodiment, showing the mold closed.
Figure 3:
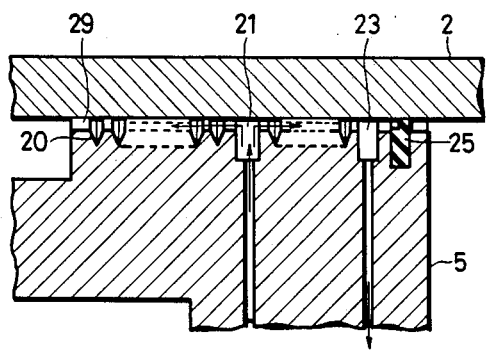
FIG. 3 is an enlarged cross section showing the principal portion of the embodiment.

In FIGS. 1–3 showing one embodiment of the mold clamping system according to the present invention, reference numeral 1 denotes a mold clamp cylinder, 2 a mold clamp ram, 3 a rod of the mold clamp ram 2, 4 a piston of the mold clamp ram 2, 5 a bearing portion for the rod 2, 6 a flange of the bearing portion 5, 7 a pressure port, 8 a booster ram, 9, 10 and 11 chambers within which an pressure oil is present, 12 a movable platen, 13 a molding die attached to the movable platen 12, 14 a stationary platen, 15 a molding die attached to the stationary platen 14, and 16 tie bars. A straight-hydraulic mold clamping system of a horizontal construction comprising the aforementioned components is known to the art.

In the present embodiment, however, the bearing portion 5 is constituted by a bushing formed of a wear resistant material such as a carbon fiber etc. and provided in the inner circumference thereof with a plurality of balancing grooves 20 as oil grooves. Each of the balancing grooves 20 is formed in the inner circumferential surface of the bearing portion 5 in the shape of a circular ring so as to surround the rod 3 and has a V-shaped cross section. From the base end of the bushing in the left end in FIG. 3, extends an opening 29 in the inner circumferential surface of the bushing to the balancing grooves 20, and the balancing grooves 20 communicate directly with the chamber 11 through the opening 29 formed in the inner surface of the bearing portion 5. The opening 29 has a size such that the rod 3 is capable of advancing or retreating, specifically a size of about 30μ.

The bearing portion 5 is provided midway along the length thereof with a pressure port 21 which communicates with an oil pressure source 22 and adjacent the axial leading end thereof, the right end in FIG. 3, with a port 23 which communicates with a drain tank 24. The axial leading end of the bearing portion 5 is sealed with a dust seal 25. Further, the piston 4 of the mold clamp ram 2 is provided in the outer circumference thereof with a plurality of circular ring-shaped grooves 26 having a V-shaped cross section. The V-shaped grooves in the piston 4 communicate respectively with the chambers 10 and 11 through a clearance between the piston 4 and the cylinder 1. The size of this clearance is set so that a thin oil film will be formed therewithin. The piston 4 has its inner circumference provided with a ball bearing 27 as a ball and roller bearing. Similarly, the holes in the movable platen 12, serving as the sliding portions, into which the tie bars 16 are inserted are each provided with a ball bearing 28. Since the ball bearings 27 and 28 are used under the condition of non-load, ball bearings having high dimensional accuracy can be adopted.

With the construction described above, a pressurized oil is constantly supplied from the oil pressure source 22 to each of the balancing grooves 20 through the pressure port 21 and simultaneously flows slightly into the drain tank 24 and the chamber 11 on the base end through the port 23 adjacent the axial leading end and through clearance 29, respectively. Therefore, since the pressurized oil uniformly functions in the radial direction of each of the balancing grooves 20, the oil pressure balance within the balancing grooves 20 can be maintained in the radial direction. Within the clearance between the rod 3 and the bearing portion 5, there is formed an oil film uniformly filled with the pressurized oil, and the rod 3 can slide in the axial direction under a condition near the condition of non-load. Since the rod 3 supports both the movable platen 12 and the molding die 13 in a cantilever manner by utilization of the rigidity of its large diameter portion and since the lateral pressure exerted on the bearing portion 5 due to the cantilever construction is dispersed by the oil in the balancing grooves 20, the rod undergoes self-alignment, and the movable platen 12 and the molding die 13 have their parallelism maintained without becoming eccentric. This oil pressure balance prevents the tie bars 16 from being loaded by the movable platen 12 and the molding die 13. Further, since the pressurized oil is supplied independently of the mold clamping mechanism, it allows the parallelism of the platen to be obtained irrespective of the mold-opening and mold-closing movements.

In the mold clamp, when the oil pressure is applied to the chamber 9 of the booster ram 8 in the mold-closing region, since the rod 3 is in a state near the non-load state, the rod 3 advances immediately. The ball bearings 28 of the movable platen 12 are not affected by their own weights and are moved with the tie bars 16 as guides. In proportion as the rod 3 advances, the distance at which the movable platen 12 and the molding die 13 in a cantilever manner becomes large so as to increase the lateral pressure. However, since the self-alignment of the rod 3 can be obtained even under the increased lateral pressure by the pressurized oil stored in the balancing grooves 20, the horizontality of the rod 3 per se is still maintained precisely. The rigidity of the rod 3 does not affect either the parallelism of the movable platen 12 or that of the molding die 13. Therefore, the rod 3 allows the parallelism of the movable platen to be continuously maintained from the low-speed mold-closing region through the high-speed mold-closing region to the mold-closing protection region of the mold clamping cycle. The molding die 13 of the movable platen 12 and the molding die 15 of the stationary platen 14 have their parting surfaces fitted to register with each other. During this time, oil is supplied into the chamber 10 through the pressure port 7.

Further, in the high-pressure mold clamping region, the pressure port 7 is closed and the pressurized oil acts on the mold clamp ram 2 to generate a predetermined high-pressure mold clamping force. In accordance with the mold clamp under a high pressure, the oil pressure is applied to the inside of the V-shaped grooves 26 in the piston 4. As a result, the oil pressure balance functions not only on the rod 3 side but also on the piston 4 side, thereby maintaining the parallelism of the platen at the two positions.

During the mold-opening, the pressure port 7 is opened and, at the same time, the oil pressure is applied to the inside of the chamber 11. Since the oil pressure is also applied from the chamber 11 to the V-shaped grooves 26 of the piston, the oil pressure balance of the piston 4 is maintained. Accordingly, since the piston 4 and the rod 3 are in a state near the state of non-load and since the bearing 27 is disposed on the inner circumference of the piston 4, the mold clamp ram 2 retreats in susceptible response to the oil pressure to effect the mold-opening. It goes without saying that the parallelism of the platen has been maintained in the mold-opening region.

Figure 4:
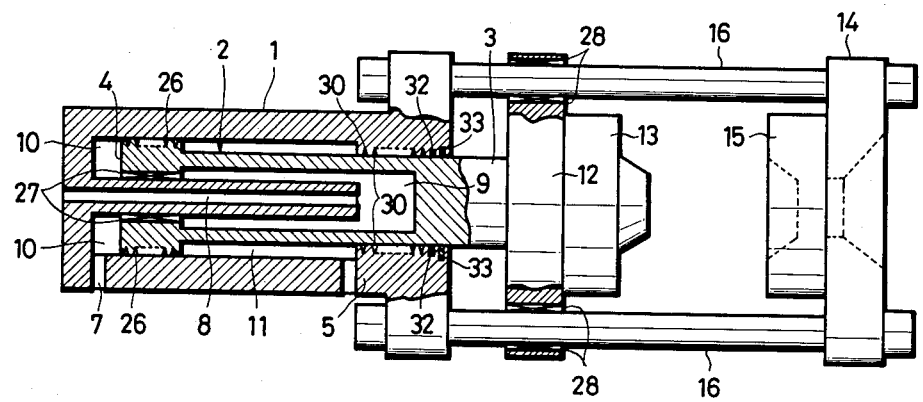
FIG. 4 is a partially sectioned schematic view of another embodiment of the mold clamping system according to the present invention, showing the mold open.
Figure 5:
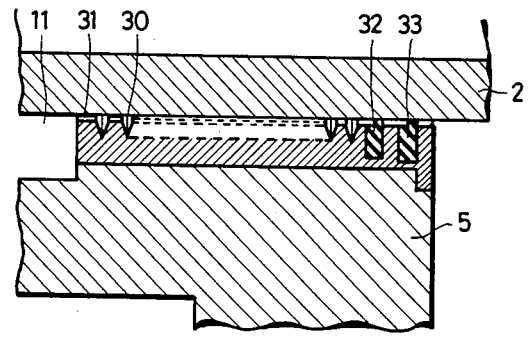
FIG. 5 is an enlarged cross section showing the principal portion of the embodiment in FIG. 4.

In FIGS. 4–5 showing another embodiment of the mold clamping system according to the present invention, the reference numerals identical to those of the preceding embodiment depict the same components which function similarly and, therefore, the explanation thereof will be omitted.

There are formed a plurality of circular ring-shaped balancing grooves 30 which communicate with the chamber 11 through a clearance 31. The clearance 31 has a size such that a thin oil film will be formed therein. Although the size depends on manufacturing accuracy, it is set to be not more than about 15$\mu$, preferably not more than 5$\mu$. The axial end of the bushing on the movable platen side is sealed such as with seal packing 32 and a dust seal 33, for example.

The balancing grooves 30 of the bearing portion 5 are filled uniformly with an oil and a thin oil film is formed within the clearance 31. Similarly, the V-shaped grooves 26 are filled with an oil and an oil film is formed within the clearances on both sides of the piston. Therefore, the thrust of the rod 3 in the axial direction is in a state near the state of non-load.

In the mold-closing, in proportion as the rod 3 advances, the oil film formed in the clearance 31 serves as a boundary layer and oil is supplied into the balancing grooves 30. The thin oil films formed in the V-shaped grooves 26 and the clearances of the piston 4 serve also as boundary layers.

In the mold-opening, oil pressure is applied from the chamber 11 to the balancing grooves 30 through the clearance 31 and the thin oil film serves as a boundary layer.

According to the embodiment described above, since the oil film can function as the rod 3 advances or retreats, it is unnecessary to provide any special construction for the supply of pressurized oil. Therefore, the construction can be greatly simplified and a reduction in manufacturing cost can be achieved.

The embodiments wherein the piston 4 has provided in the outer circumference thereof V-shaped grooves 26 have been described. However, the outer circumference may be formed of a sliding contact construction without forming any V-shaped groove.

Although the booster ram type mold clamping system has been described with reference to the illustrated embodiments, the present invention should not be limited to these embodiments. Insofar as the straight-hydraulic mold clamping system comprises a mold clamp cylinder, platens and tie bars, the system may be of an auxiliary cylinder type and an intensifying cylinder type, for example.

Further, in place of the ball bearing 27 used in the illustrated embodiments, a plain bearing may be used. In this case, the plain bearing may be provided in the inner circumferential surface of the bearing hole thereof with V-shaped grooves.

According to the present invention, therefore, the following effects can be brought about.

Since the bearing portion for the rod is provided with annular oil grooves within which a pressurized oil functions, the rod can be horizontally supported by utilization of the oil film formed within the clearance at the bearing portion and, at the same time, the parallelism of the movable platen and the molding die attached thereto can precisely be maintained by utilization of the rigidity of the rod. Although the lateral pressure is exerted on the bearing portion in proportion as the rod advances or retreats, since the rod is subjected to self-alignment, the parallelism of the platen can be set uniformly at all times. As a result, it is possible to reduce the deviation from parallelism to less than about 10$\mu$ and, consequently, the present invention is applicable to molding dies for molding precision parts to make it possible to effect precision molding.

Since the pressurized oil acts on both the rod and the bearing portion, the rod is in a state near the non-load state and, therefore, it is possible to effect mold-opening and mold-closing at a high velocity without causing any rattling phenomenon. In the mold-closing protection region, a low velocity feed has heretofore been effected under large load. In the present invention, however, since the slow speed feed can be carried out under slight pressure particularly in the mold-closing protection region, it is possible to precisely detect the presence of foreign matter.

Since the movable platen is supported in a cantilever manner by utilization of the rigidity of the rod, the diameter of the tie bars can be made small and the surface of the movable platen to which the molding die is to be attached can be enlarged.

Since the contact between the rod and the bearing portion is not metallic contact, the contact portion is not worn even during use for a long period of time. Precise parallelism of the platen can be maintained over a long period of time. Even though the weight of the molding die varies, since the piston is always subjected to self-alignment, there is no need of carrying out slight adjustment.

What is claimed is:

1. A straight-hydraulic mold clamping system in an injection molding machine, which comprises:
   a mold clamp cylinder having an inner chamber;
   a reciprocating piston slidably mounted within said inner chamber for dividing said inner chamber into two chamber parts;
   a rod having a rear end connected to said piston and a leading end extending out of said mold clamp cylinder, said mold clamp cylinder having a bearing portion slidably supporting said rod and having an inner circumference having at least one sealing member in sealing engagement with said rod;
   a movable platen attached to said leading end of said rod and having thereon one mold half of a pair of mold halves constituting an injection mold;
   a stationary platen disposed opposite to said movable platen and having the other mold half of said injection mold mounted thereon; and
   tie bars extending between said mold clamp cylinder and said stationary platen and slidably supporting said movable platen,
   said bearing portion of said mold clamp cylinder having an inner circumferential surface having therein a plurality of narrow annular outwardly divergent V-shaped oil grooves, said inner circumferential surface and said rod having a clearance therebetween through which said narrow annular oil grooves communicate with one of said chamber parts of said inner chamber in said mold clamp cylinder, and said piston having an outer circumferential surface having therein a plurality of further narrow annular outwardly divergent V-shaped grooves, said outer circumferential surface of said piston and the inner circumferential surface of said mold clamp cylinder having a clearance therebetween through which said further narrow annular grooves communicate with said chamber parts of said inner chamber in said mold clamp cylinder.

* * * * *